No. 640,305. Patented Jan. 2, 1900.
T. M. LYNCH.
CULINARY ROASTER.
(Application filed Aug. 23, 1898.)
(No Model.) 4 Sheets—Sheet 1.

Witnesses. Inventor.
Thomas Macey Lynch
By
his Attorneys

No. 640,305. Patented Jan. 2, 1900.
T. M. LYNCH.
CULINARY ROASTER.
(Application filed Aug. 23, 1898.)
(No Model.) 4 Sheets—Sheet 3.
Fig. 3.
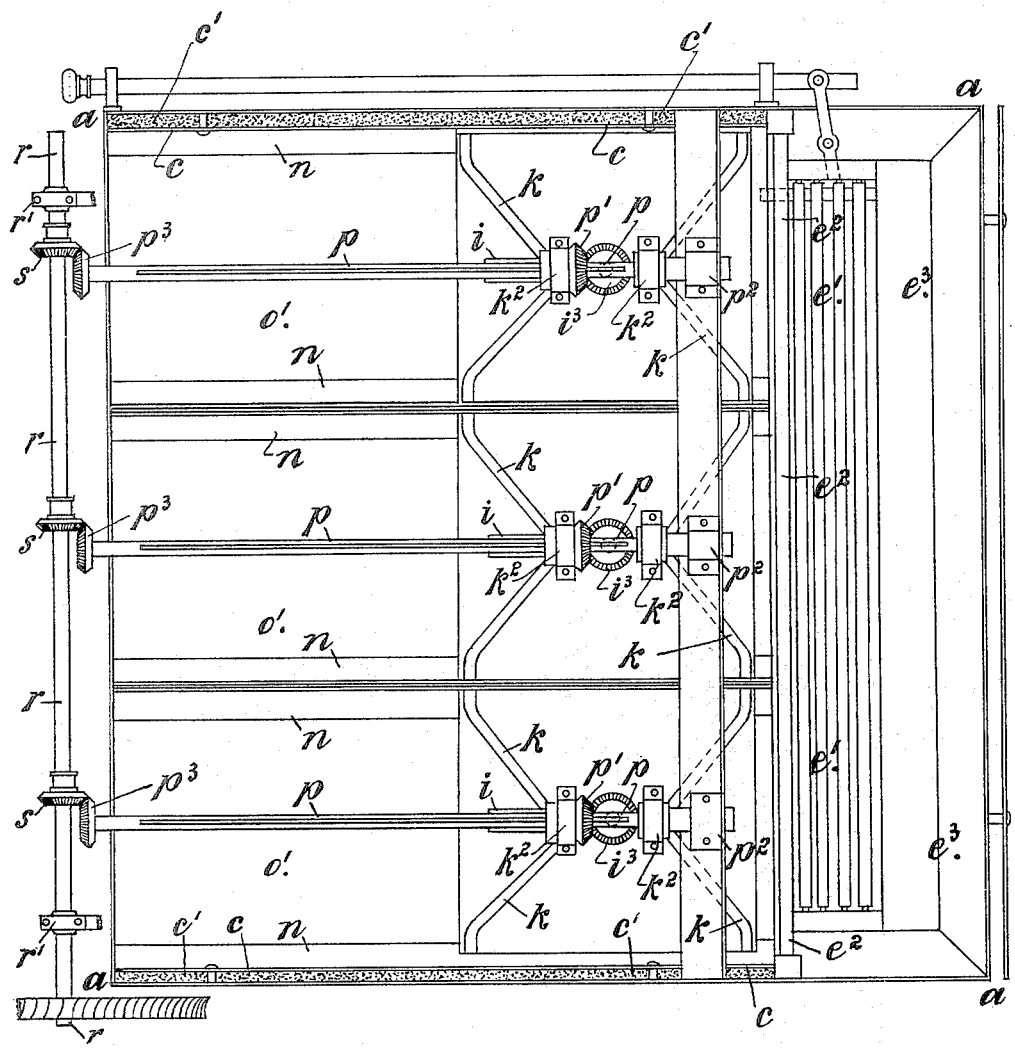
Witnesses.
Inventor:
Thomas Massey Lynch
By
his Attorneys.

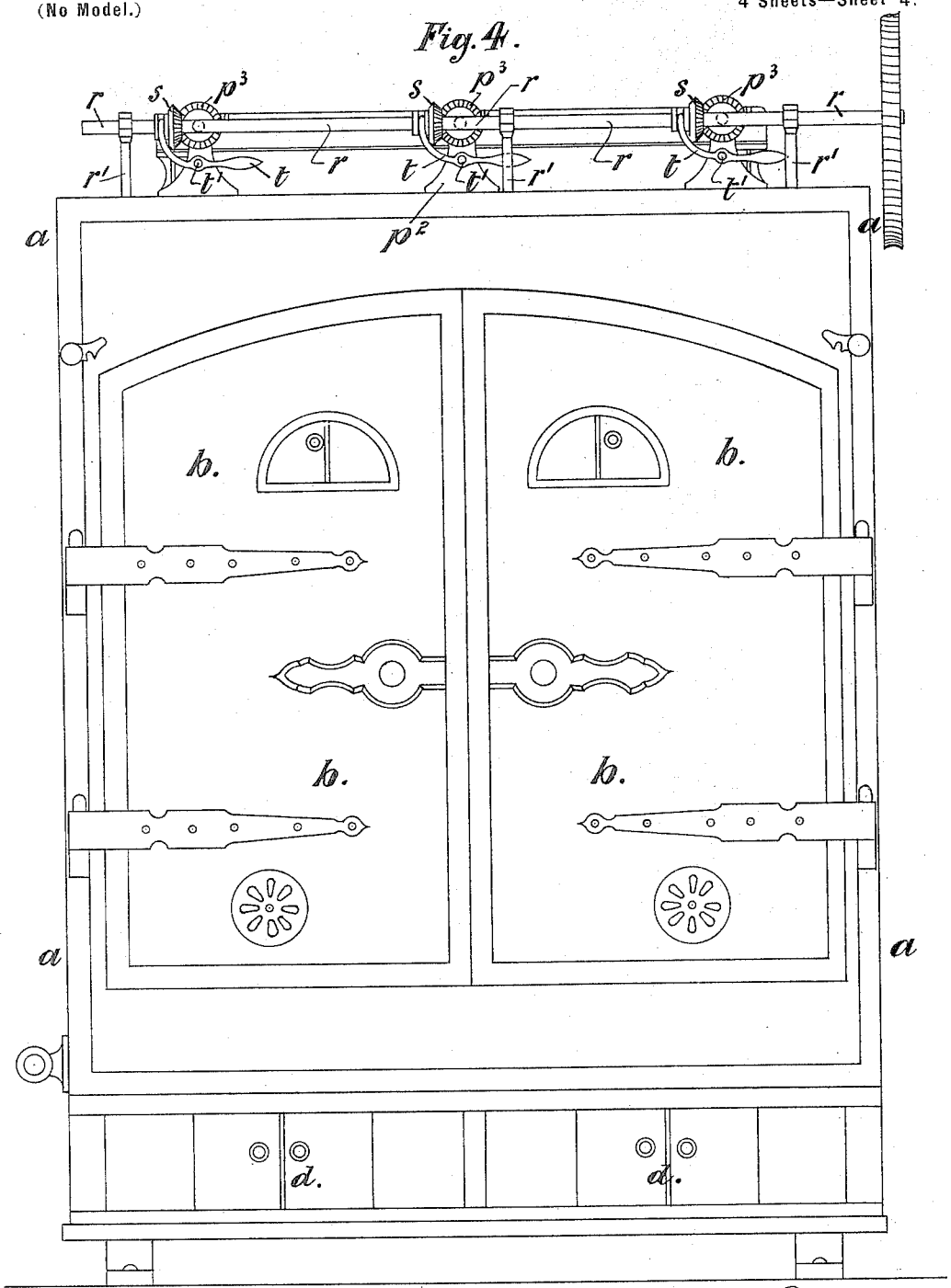

UNITED STATES PATENT OFFICE.

THOMAS MASSEY LYNCH, OF LIVERPOOL, ENGLAND.

CULINARY ROASTER.

SPECIFICATION forming part of Letters Patent No. 640,305, dated January 2, 1900.

Application filed August 23, 1898. Serial No. 689,292. (No model.)

*To all whom it may concern:*

Be it known that I, THOMAS MASSEY LYNCH, a subject of the Queen of Great Britain, and a resident of Liverpool, England, have invented certain new and useful Improvements in Culinary Roasters, of which the following is a specification.

This invention has reference to roasters for roasting meat, poultry, game, and the like wherein the meat or viand is roasted before a fire; and the chief object of the invention is to provide certain improvements, hereinafter described, connected with the spits or trees in roasting apparatus for use on board ship.

In roasters for use on board ship the apparatus comprises generally a closed oven or chamber, with an open fire therein—say upon the back or sides—and with revolving spits or trees, on which the meat or other thing to be roasted is carried, disposed in front of the fire, and main doors at the front, by which substantially the whole front can be closed up or opened out.

The spits or trees of the roaster are movable, so that they can be moved or adjusted closer to or farther from the fire; and according to this invention the improvements consist mainly of a construction and arrangement of spits and means for effecting their movement away from and up to the fire, as hereinafter described.

The invention will be described with the aid of the accompanying drawings, in which—

Figure 1:
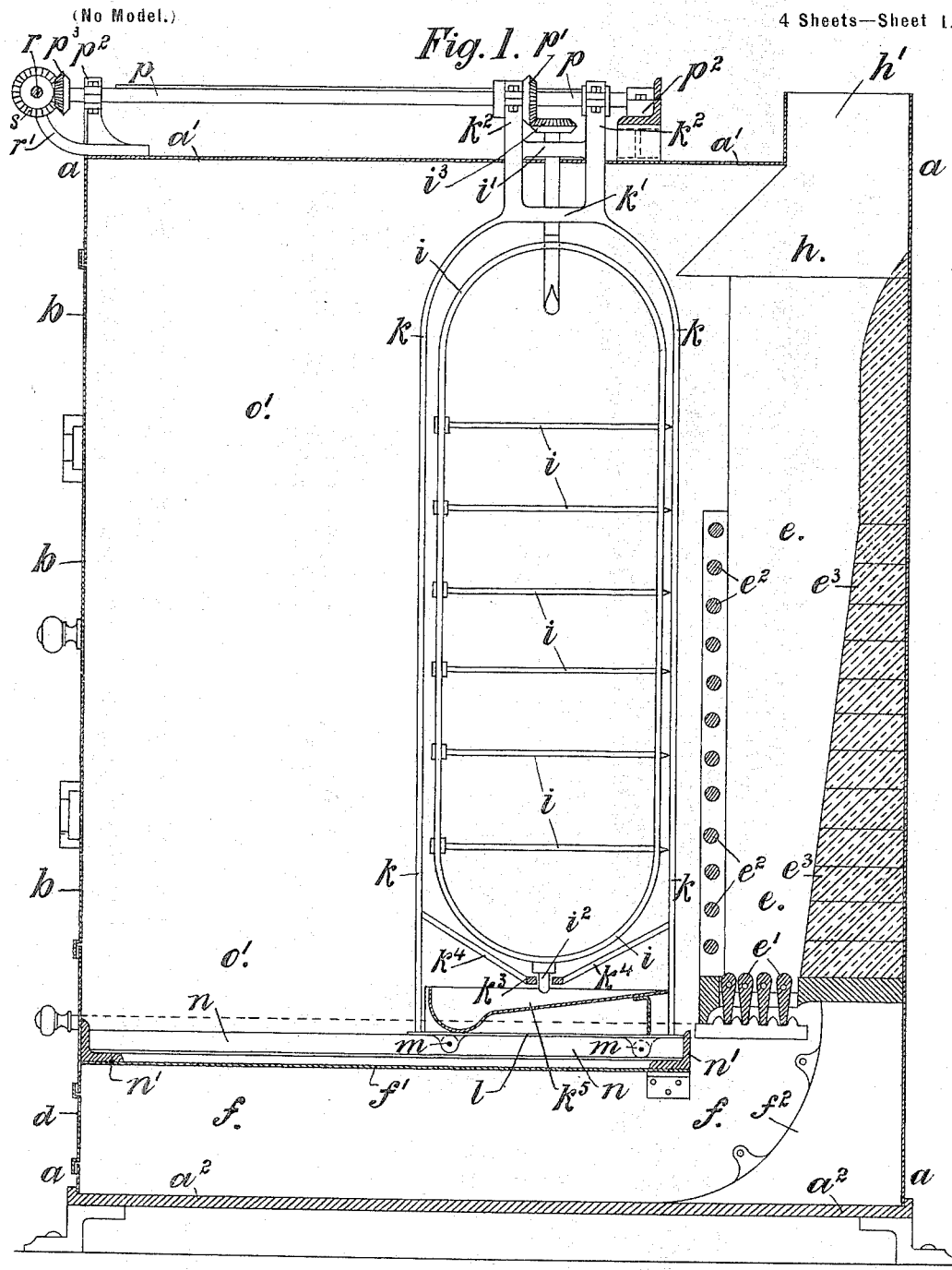
Figure 2:
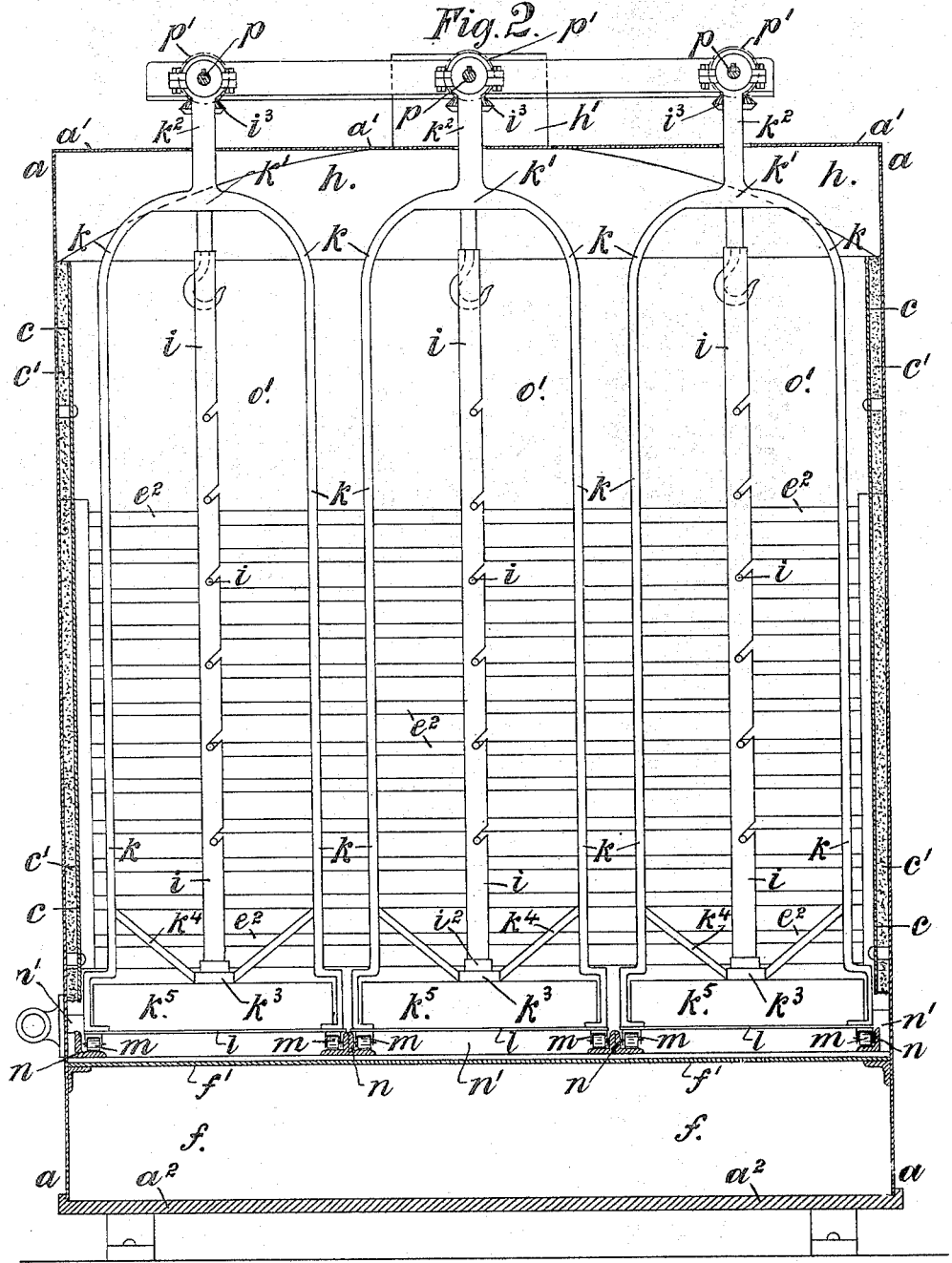

Figure 1 is a side sectional elevation, Fig. 2 a front sectional elevation, Fig. 3 a plan, with top plate and hood removed, and Fig. 4 a front elevation, illustrating a roaster according to this invention.

Referring to the drawings, $a$ generally designates the casing of the roaster, which is, say, of thin iron or steel.

$a'$ is the roof of the apparatus, and $a^2$ the base-plate—say of cast-iron—on which the whole apparatus is carried.

$b$ are the main doors of the roaster for gaining access to the interior.

$c$ are internal plates forming an internal skin to the sides of the casing $a$, and $c'$ is nonconducting material between the case $a$ and plates $c$, by which the case is protected and the radiation of heat in a large measure prevented.

$d$ are doors for closing and gaining access to the ash-pit.

$e$ generally designates the fireplace, which is disposed along the whole back of the roaster and is comprised of the grate-bars $e'$, which are preferably of the rocking type, the front bars $e^2$, and the brickwork back and sides $e^3$.

$f$ is the ash-pit below the fireplace and the roasting-chamber proper, $o'$, above, which is separated from the latter by a plate $f'$ and has a curved back plate $f^2$.

$h$ is a hood over the fireplace $e$, and $h'$ a flue leading from it.

$i$ are the spits proper, on which the viands are hung or supported.

Regarding the novel features and characteristics in the construction, arrangement, and mode of operating the spits $i$, they are mounted and revolved in rigid frames. These frames consist of four standard or vertical parts or bars $k$, which extend up and at the top are joined up together and formed into a cross-bar at $k'$, which serves to act as a lower bearing to the upper journals $i'$ of the spits $i$. On the upper end or part of each frame $k$ there are provided brackets $k^2$, through the upper ends of which a shaft $p$ passes, which, as hereinafter described, serves to rotate the spits $i$ and also forms the support against lateral movement of the upper end of the frame. The lower ends of the frame-bars $k$ are rigidly connected to a base $l$, which may be in the form of a plate and has mounted on its under side a roller $m$ at each corner. This base device constitutes a trolley and with the bars $k$ forms a rigid structure or cage. The whole vertical weight of this cage, with the spit $i$ and the meats carried upon it, is supported by two angle-bars $n$, which extend between the front of the oven and the angle transverse bar $n'$, extending from side to side of the apparatus. These angle-bars $n$ not only take the weight, but they also serve as railways on which the several whole spit mechanisms may run or move between the fire at the back and the front of the oven. On these railways, therefore, the several spit mechanisms can be adjusted nearer to or farther from the fireplace $e$ or moved up to the doorway in front for fixing the viands on the spits or taking them off. On the lower end of the spit $i$ is a pivot-pin $i^2$, which fits and works in a socket $k^3$, supported by arms $k^4$, connected with the frame-bars $k$. The shoulder of the pin $i^2$ rests on the upper surface of the socket $k^3$ and takes the whole weight of the spit $i$ and the meats supported by it.

The rotation of each of the spits on its axis is effected through the shaft $p$, a bevel-wheel $p'$, mounted in one of the brackets $k^2$ and rotated by $p$ by a feather and keyway in the well-known way, and a bevel-wheel $i^3$ on the upper end of the journal $i'$ of the spit $i$ with which the bevel-wheel $p'$ meshes. The two ends of each of the shafts $p$ are mounted in bearings $p^2$, and they are all rotated through a counter-shaft $r$, mounted and running in bearings $r'$, and bevel-wheels $p^3$ on the shafts $p$, meshing with the bevel-wheels $s$ on the shaft $r$. The respective bevel-wheels $s$ are adapted to be moved longitudinally on the shaft $r$ and individually thrown in and out of gear with the bevel-wheels $p^3$ by hand-levers $t$, mounted at $t'$, the end of which engages with the bosses of the pinions $s$ in the well-known manner of clutch-gearing.

The shaft $r$ is rotated by any suitable means.

At the bottom of each of the spit-frames $k$ there is a dish $k^5$ for catching the gravy and liquid matters falling from the things being cooked.

What is claimed in respect of the herein-described invention is—

1. In a ship's or analogous roaster, a vertically-disposed spit-frame comprising rigid vertical bars, as $k$, and a base having rollers as $m$; railways $n$ on which said frame runs up to and away from the fire; and a spit carried by bearers above and below within said frame, and adapted to revolve in said bearings; substantially as set forth.

2. In a ship's or analogous roaster, a rigid vertically-disposed spit-frame supported and adapted to move to and fro on its lower end, and supporting within it, by lower and upper bearings, the upper and lower ends of a spit; and a horizontally-disposed rotatable shaft arranged in connection with the upper part of the spit-frame; and gearing between said shaft and the upper part of the spit, by which said spit is rotated from said horizontal shaft; substantially as set forth.

3. In a ship's or analogous roaster, the combination of the rigid spit-frame $k\ l$; the spit $i$, the lower and upper ends of which are mounted and revolve in bearings in said frame; the bevel-wheel $i^3$ on the upper end of the spit-journal; the bevel-wheel $p'$ meshing with $i^3$ and mounted on the upper part of the frame; and the rotatable shaft $p$ passing through the wheel $p'$ and frame, and meshing with the wheel $p'$ internally; the said wheel $p'$ and frame being adapted to slide longitudinally over said shaft; substantially as set forth.

In witness whereof I have hereunto set my hand in presence of two witnesses.

THOMAS MASSEY LYNCH.

Witnesses:
ERNEST R. ROYSTON,
JOHN H. WALKER.